United States Patent

Brener et al.

[11] Patent Number: 6,118,523
[45] Date of Patent: Sep. 12, 2000

[54] HIGH-RESOLUTION ZERO-DISPERSION WAVELENGTH MAPPING IN SINGLE MODE FIBER

[75] Inventors: Igal M. Brener, Westfield; David J. Thomson, New Providence; Partha P. Mitra, Summit; Daniel D. Lee, Short Hills, all of N.J.; Dan L. Philen, Atlanta, Ga.

[73] Assignee: Lucent Technologies, Inc., Murray Hill, N.J.

[21] Appl. No.: 09/253,824

[22] Filed: Feb. 19, 1999

Related U.S. Application Data

[60] Provisional application No. 60/075,440, Feb. 20, 1998.

[51] Int. Cl.$^7$ .................................................. G01N 21/00
[52] U.S. Cl. ............................................ 356/73.1; 385/27
[58] Field of Search .............................. 356/73.1; 385/27, 385/24, 147, 15, 39, 45, 46, 122, 123, 126, 127, 141

[56] References Cited

PUBLICATIONS

M. Ohashi and M. Tateda, Novel Technique for Measuring Longitudinal Chromatic Dispersion Distribution in Singlemode Fibres, 29 Electronic Letters 426–428 (1993).

Hiroshi Onaka et al., Measuring the Longitudinal Distribution of Four–Wave Mixing Efficiency in Dispersion–Shifted Fibers, 6 IEEE Photonics Tech. Letters 1454–1456 (1994).

Y. Suetsugu et al., Measurement of Zero–Dispersion Wavelength Variation in Concatenated Dispersion–Shifted Fibers by Improved Four–Wave–Mixing Technique, 7 IEEE Photonics Tech. Letters 1459–1461 (1995).

S. Nishi and M. Saruwatari, Technique for Measuring the Distributed Zero Dispersion Wavelength of Optical Fibres Using Idler Pulse Generation Caused by Modulation Instability, 32 Electronics Letters 579–581 (1996).

L. F. Mollenauer et al., Method for Facile and Accurate Measurement of Optical Fiber Dispersion Maps, 21 Optics Letters 1724–1726 (1996).

Michael Eiselt et al., Nondestructive Position–Resolved Measurement of the Zero–Dispersion Wavelength in an Optical Fiber, 15 J. Lightwave Tech. 135–143 (1997).

*Primary Examiner*—Frank G. Font
*Assistant Examiner*—Tu T. Nguyen
*Attorney, Agent, or Firm*—Synnestvedt & Lechner LLP

[57] ABSTRACT

An accurate and simplified method of non-destructively measuring the zero-dispersion wavelength along the length of a single-mode fiber is disclosed. The method includes the steps of measuring the FWM intensity of the optical fiber at a plurality of wavelengths, plotting the measured FWM intensity at each of the plurality of wavelengths to obtain a curve representative of the FWM intensity of each of the plurality of wavelength, and performing a non-linear inversion on the curve to obtain the zero-dispersion wavelength along the length of the fiber.

2 Claims, 3 Drawing Sheets

HIGH-RESOLUTION ZERO-DISPERSION WAVELENGTH MAPPING IN SINGLE MODE FIBER

This application is based on Provisional application Ser. No. 60/075,440, filed on Feb. 20, 1998, incorporated by reference herein.

FIELD OF THE INVENTION

This invention relates to a non-invasive technique for measuring the spatial variation of the zero-dispersion wavelength ($\lambda_0$) along the length of a single-mode fiber, and more particularly to such a technique using low power continuous wave lasers.

BACKGROUND OF THE INVENTION

Chromatic dispersion limits the bandwidth of optical fibers by producing pulse spreading due to the various colors of light traveling in the fiber. Different wavelengths of light travel at different speeds; thus, since most optical sources emit light containing a range of wavelengths, each of these wavelengths arrive at a destination at different times, thereby causing the transmitted pulse to spread or "disperse" as it travels down the fiber.

Chromatic dispersion is the sum of material and waveguide dispersion of the fiber. Dispersion can be positive or negative because it measures the change in the refractive index with respect to the wavelength. Thus, the total chromatic dispersion can be zero (or approximately zero); the wavelength at which the chromatic dispersion is zero is known as the zero dispersion wavelength.

Accurate knowledge of dispersion is very important in high speed WDM optical links, because a pulse can travel essentially undistorted along the length of the fiber if the wavelength of the pulse can be matched to the zero-dispersion wavelength of the fiber. It is well known that the physical properties of fibers vary as the fiber is being drawn. This influences the optical properties, especially the dispersion. Several non-destructive techniques have been developed to measure the chromatic dispersion and the zero dispersion wavelength variations along the length of a fiber. One linear technique based on the use of an Optical Time Domain Reflectometry (OTDR) has been proposed for step-index fibers as described in an article in Electronics Letters 29, 426 (1993) by M. Ohashi and M. Tateda, incorporated by reference herein. Other reported techniques rely on the use of four-wave mixing (FWM) as a probe for the chromatic dispersion (D) or zero-dispersion wavelength ($\lambda 0$) fluctuation (see, for example, Y. Suetsugu, T. Kato, T. Okuno, and M. Nishimura, IEEE Phot. Lett. 7, 1459 (1995); S. Nishi and M. Saruwatari, Electron. Lett. 32, 579 (1996); and M. Eiselt, R. M. Jopson, and R. H. Stolen, J. Lightwave Technol. 15, 135 (1997), all of which are incorporated by reference herein). To date, the most effective technique uses the temporal oscillations in a backscattered FWM to measure the dispersion profile at a fixed wavelength, providing a spatial resolution of less than 500 m in the dispersion mapping. See. L. F. Mollenauer, P. V. Mamyshev, and M. J. Neubelt, Optics Letters 21, 1724 (1996), incorporated herein by reference.

The zero-dispersion wavelength spatial distribution can, in principle, be inferred from the profile measured at different wavelengths, and each of the prior art techniques described above is based on such imprecise inferential methods. There are many situations, however, which require exact, accurate information about the zero-dispersion wavelength distribution along the fiber length. For example, fiber devices which are based on the use of FWM usually require fiber having a very uniform zero-dispersion wavelength; thus, for such devices, accurate knowledge of the zero-dispersion wavelength along the length of the fiber is needed. None of the prior art non-destructive methods allow such a precise measurement of the zero dispersion wavelength.

SUMMARY OF THE INVENTION

The present invention presents an accurate and simplified method of non-destructively measuring the zero-dispersion wavelength along the length of a single-mode fiber. This is accomplished by a method, comprising the steps of measuring the FWM intensity of the optical fiber at a plurality of wavelengths; plotting the measured FWM intensity at each of the plurality of wavelengths to obtain a curve representative of the FWM intensity of each of the plurality of wavelength; performing a non-linear inversion on the curve to obtain the zero-dispersion wavelength along the length of the fiber.

In a preferred embodiment, the measuring step comprises the steps of scanning the output beam wavelengths of two polarized tunable lasers into an input end of the optical fiber, keeping the output beam wavelengths separated by a constant wavelength; and continuously monitoring and recording the FWM intensity of the scanned output beam wavelengths at an exit end of the fiber.

DETAILED DESCRIPTION OF THE PREFERRED EMBODIMENTS

Figure 1:
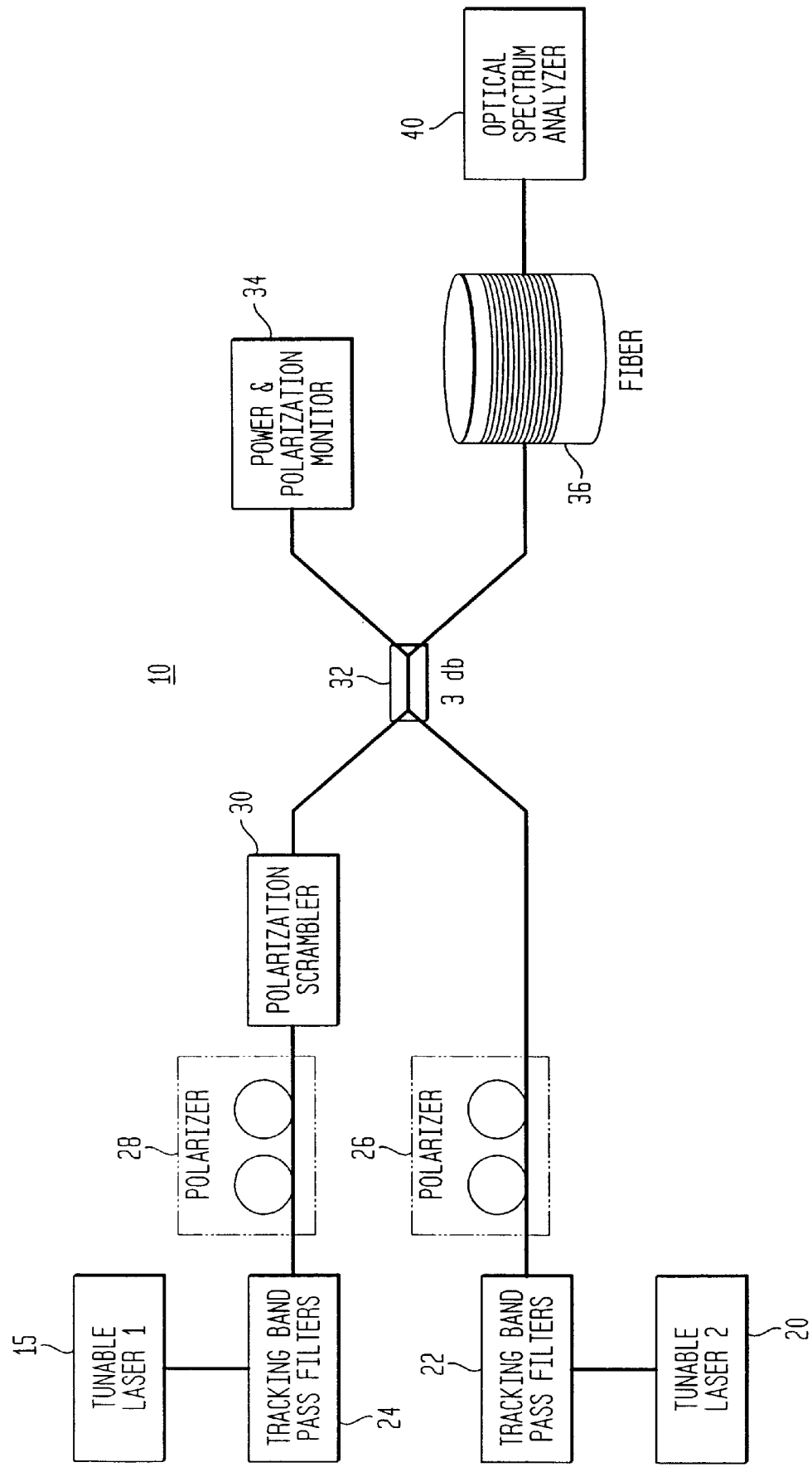
FIG. 1 is a schematic drawing of a system used in accordance with the present invention to measure the FWM intensity of two scanned lasers along the length of an optical fiber.

FIG. 1 illustrates a general system 10 which is utilized to obtain necessary information about a length of fiber so that the zero-dispersion wavelength along the fiber can be calculated in accordance with the present invention. Referring to FIG. 1, the inputs of two tunable lasers 15 and 20 (for example, external cavity lasers) are combined to a polarization state using polarizers 28 and 29 and the combined wave is launched into the fiber 36 under test at an input end via a 50% power splitter/combiner 32. In the preferred embodiment the polarization is collinear; however, it is understood that the polarization could be other than linear, for example random polarization. In random polarization, polarization scrambler 30 randomizes the polarization so, on average, there is approximately 50% of the light in each of the two polarizations. A power and polarization monitor monitors the polarization to assure that the two lasers 15 and 20 are copolarized.

Tracking bandpass filters 22 and 24 are placed at the output of lasers 15 and 20, respectively, to suppress any spurious amplified spontaneous emissions (ASE) background (and any other light present at any wavelength other than the laser wavelength) and improve the dynamic range of the measurement in a known manner. Ideally, the combined power of the two lasers 15 and 20 should be less than 4 dbm so that the effects of nonlinearities (such as Stimulated Brillouin Scattering and modulational instability) are insignificant.

The two tunable lasers 15 and 20 are scanned together keeping a constant separation between the wavelengths of the two continuous waves. This constant separation is called the detuning wavelength $\Delta\lambda$. The wavelength $\lambda_1$ of tuneable laser 15 and the wavelength $\lambda_2$ of tuneable laser 20 are varied such that $\Delta\lambda = \lambda_1 - \lambda_2$.

At the other end of the fiber 36 (the exit end), the FWM peaks are continuously analyzed via, for example, an optical spectrum analyzer 40 or by using other known methods such as lockin detection. This technique can be applied to any wavelength range covered by the zero-dispersion wavelength $\lambda_0$ provided that the lasers can be tuned through the wavelength region of interest (i.e., $\lambda_1$ and $\lambda_2$ have to be swept through the region at which the dispersion is zero). Conventional single mode fiber with $\lambda_0 \sim 1.3$ $\mu$m and new dispersion shifted fibers with $\lambda_0 > 1.6$ $\mu$m and $\lambda_0 < 1.5$ $\mu$m can be readily analyzed with this technique.

Using the structure and methods described above with respect to FIG. 1, the two lasers are scanned at the constant wavelength separation $\Delta\lambda$, and for every point in the scan the lasers are traced. The scan is stopped and the FWM intensity for that set of $\lambda_1$ and $\lambda_2$ is recorded and plotted. This plot produces a map of the FWM intensity for all of the wavelengths of lasers 15 and 20.

The above described scan is started using values of $\lambda_1$ and $\lambda_2$ that are less than the minimum zero-dispersion wavelength ($\lambda_{0min}$) and is completed when the scan has passed through the maximum zero dispersion wavelength ($\lambda_{0max}$). When a full plot is completed, if the spatial dependancy $\lambda_0(z)$ could be inferred, the zero-dispersion wavelength could be determined. However, the plot contains only information relating to the magnitude of the FWM and not the phase. To be able to calculate the zero-dispersion wavelength the phase of the FWM must be calculated.

According to the present invention, the phase of the FWM is calculated by performing a non-linear inversion procedure. This non-linear inversion allows the measured, plotted curve to be "transformed" to the spatial profile of the zero-dispersion wavelength.

In general, without knowing the phase of the FWM, the Fourier transform could not be inverted. However, since the magnitude of the FWM is known both in real and Fourier space, the non-linear inversion problem will have a unique inverse as long as $\phi(z)$ is analytic and $\alpha > 0$ in Equation (4), below.

In a FWM process two photons at $\omega 1 (\omega 2)$ (the pump) are mixed with one photon at $\omega 2 (\omega 1)$ to generate new photons at $\omega FWM = 2\omega 1 - \omega 2$ and $(2\omega 2 - \omega 1)$ (the Stokes and Anti-Stokes FWM). Assuming that the phase mismatch between all involved fields is position dependent (as it should be in a real fiber where physical parameters fluctuate along its length) and in the absence of absorption, the FWM intensity is given by the equation:

$$I_{FWM} \propto \left| \int_0^L dz e^{i \int_0^z \Delta\beta(z')dz'} \right|^2 \qquad (1)$$

To leading order in perturbation theory, the phase mismatch can be rewritten as:

$$\Delta\beta \approx -2\pi c \left(\frac{\Delta\lambda}{\lambda_2}\right)^2 \frac{dD}{d\lambda}(\lambda_1 - \lambda_0) \approx -2\pi c \left(\frac{\Delta\lambda}{\lambda}\right)^2 \frac{dD}{d\lambda}(\lambda_1 - \lambda_0) \qquad (2)$$

where $\Delta\lambda = \lambda_1 - \lambda_2$. Almost identical equations apply to Stokes or Anti-Stokes FWM. When the zero dispersion wavelength is constant, a known result, that maximum FWM conversion efficiency is achieved when the pump wavelength $\lambda_1$ matches the zero dispersion wavelength $\lambda_0$ (i.e., $\lambda_1 = \lambda_0$), is obtained.

The two main physical parameters that determine the fluctuation of optical properties are the core radius and the core-cladding refractive index difference of the fiber. These changes affect both the dispersion wavelength $\lambda_0$ and the dispersion slope. In destructive measurements, it has been determined that the dispersion slope is substantially constant (+/-2%). For the purpose of calculating the phase it is assumed that the dispersion slope is constant. With this assumption, Equation (1) becomes:

$$I_{FWM}(\lambda_1) \propto \left| \int_0^L dz e^{i\phi(z)} e^{-iqz} \right|^2, \; q = \kappa\lambda_1, \; \kappa = 2\pi c \left(\frac{\Delta\lambda}{\lambda_2}\right)^2 \frac{dD}{d\lambda} \qquad (3)$$

$$\phi(z) = \kappa \int_0^z \lambda_0(y) dy$$

If $\Delta\lambda$ is kept fixed then $\Delta\lambda/\lambda_2$ is substantially constant; $\kappa$ becomes a constant of the calculation; and q has dimensions of a wavevector. Thus, the FWM efficiency as a function of $\lambda_1$ measured at a constant detuning is governed by the Fourier transform of a phase-only function $e^{i\phi(z)}$.

The goal is to obtain the profile $\lambda_0(z)$ from the measured quantity $I_{FWM}(\lambda_1)$. The solution is a nonlinear inversion problem, related to a problem that has been studied in the literature, and which is known under various names, e.g., "the phase retrieval problem". To utilize the known retrieval problem to determine the spatial profile of the zero-dispension wavelength in accordance with the present invention, the phase retrieval problem is written in a simplified notation and to include absorption, as follows:

$$I(q) \propto \left| \int_0^L dz e^{i\phi(z)} e^{-iqz-\alpha z} \right|^2 \qquad (4)$$

The inverse problem of interest can now be stated as follows: given I(q) (the measured intensity of FWM light as a function of the wavelength of laser 15), find $\phi(z)$. This is closely analogous to inverting a Fourier transform. In fact, if the phase of the output electric field could be measured in addition to the intensity, then the inversion problem would be a straightforward inverse Fourier transform. In general, the lack of phase information precludes the inversion of the Fourier transform. However, the Applicant has determined that in at least one particular situation, that is, where the magnitude of the function is known both in real and Fourier space, the problem is known to have a unique inverse as long as $\phi(z)$ is analytic and $\alpha > 0$.

According to the present invention, the function $\phi(z)$ is parameterized in terms of a limited number of parameters, and then the values of the parameters that minimize the mean square error between the observations and the spectrum that would be generated by the parametrized $\phi(z)$ are determined. Several parameterizations are possible; for example, the function can be constrained to be piecewise linear, in which case the parameters are the values of the slopes in the linear portions of the function. A better parameterization is to expand the phase in terms of a basis set, such as Chebychev functions. The best results are obtained by taking a basis set that consisted of a constant, a slope, and a set of sines and cosines orthogonalized to the first two elements of a set. The inversion is regularized by truncating the expansion.

The result of the nonlinear inversion using Equation (4) is the zero dispersion wavelength profile. The FWM spectrum is a nonlinear function of the zero dispersion wavelength profile. The inversion is performed according to the following steps:

(a) First, the zero dispersion wavelength profile is parameterized in terms of a reasonable number of parameters. This is done by expressing the zero dispersion wavelength profile in terms of an expansion in terms of orthogonal functions;

(b) The zero dispersion wavelength profile that best fits the observed FWM spectrum is determined by minimizing the total squared error between the observed FWM spectrum and the FWM spectrum obtained from the functional relation between the zero dispersion wavelength profile and the FWM spectrum mentioned above;

(c) The minimization is performed iteratively, by determining successively higher order terms in the expansion step (a). The lower order terms of the expansion correspond to the longer scale spatial fluctuations in the zero dispersion wavelength profile.

In any parameterization, there is the important question of resolution. In the piecewise linear case, this corresponds to the lengths of the intervals over which the function is linear. In the case of an expansion in terms of orthogonal polynomials, the expansion is limited to a finite order of the polynomials, the largest order effectively giving the resolution. Instead of fixing the resolution by hand, it can be found from a semi-automated procedure where rapid fluctuations are penalized by adding an appropriate smoothing term to the mean square error. For example, in the inversion procedure employed, $\phi(z)$ is expanded in terms of basis functions $f_n(z)$ as $\phi(z)=$ $$\phi(z) = \sum_{n=1}^{N} a_n f_n(z)$$

$_n f_n(z)$ The function $f_n(z)$ is chosen to be such that with increasing n, $f_n(z)$ fluctuates more rapidly as a function of z (for example, as with the Tchebycheff polynomials). Truncating the expansion at a given N is one way of regularizing the inversion. The corresponding N may be chosen a priori, or by adding a cost term: cost=

$$\cos t = \lambda \sum_{n=0}^{\infty} a_n^2$$

to the mean squared error, and using a standard technique such as cross-validation.

Since the inversion procedure is nonlinear, it is difficult to give an exact treatment of the resolution. There are no exact mathematical formulae corresponding to the resolution. Such exact formulae can be found, for example, in the linear inversion of Fourier transforms, and have the form $\Delta x \Delta \kappa = 2\pi$, where $\Delta x$, $\Delta \kappa$ are respectively the resolution in real space and spread in momentum space. However, insight may be obtained from the corresponding linear inverse problem. Note that the linear inverse problem corresponds to the case where the phase is known as well as the amplitude, and inversion is performed using a Fourier transform. In this case, the resolution of the linear inversion problem, given by $$\Delta x = \frac{2\pi}{\kappa(\lambda_{max} - \lambda_{min})},$$

meaningful information about the zero-dispersion wavelength can be acquired. As an example, for a typical 25 km fiber spool and using $\Delta \lambda = 8$ nm, $(\lambda_{max} - \lambda_{min}) \approx 20$ nm so $\Delta x \approx 80$ m. In shorter spools, measuring with $\Delta \lambda = 6$ nm we obtain $(\lambda_{max} - \lambda_{min}) \approx 40$ nm so $\Delta \lambda \approx 50$ m. Longer integration time allows $(\lambda_{max} - \lambda_{min})$ to be increased, and therefore mapping $\lambda_0(z)$ with a potential spatial resolution of less than 50 m is feasible.

Figure 2A:
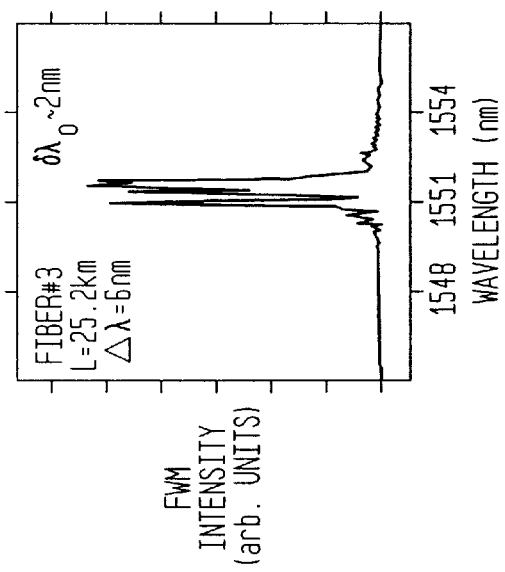
FIGS. 2a–2f show experimental FWM tuning curves, measured (2a, 2c, and 2e) and expected (2b, 2d, and 2f), of three different dispersion shifted fibers, in accordance with the present invention.
Figure 2C:
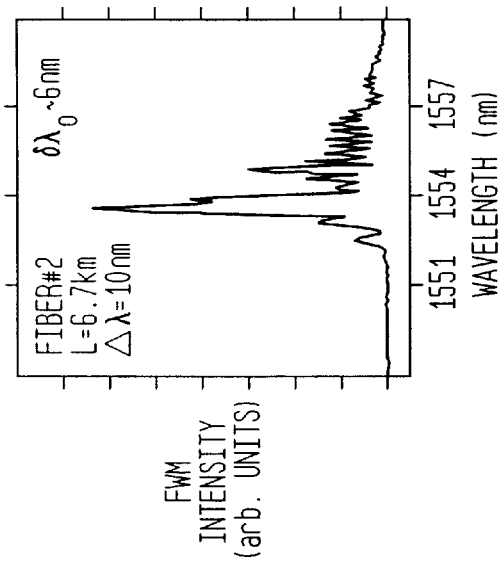
Figure 2E:
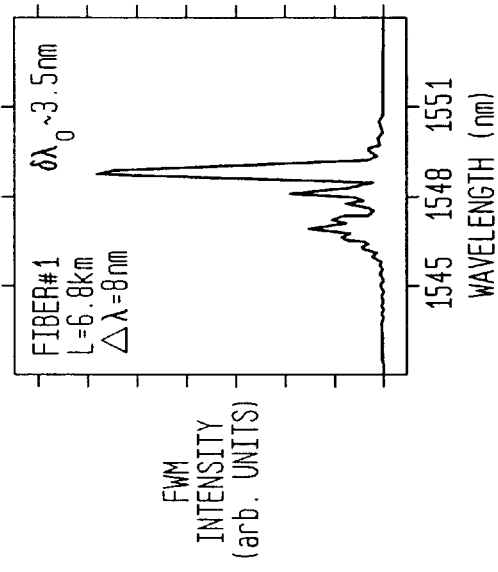
Figure 2B:
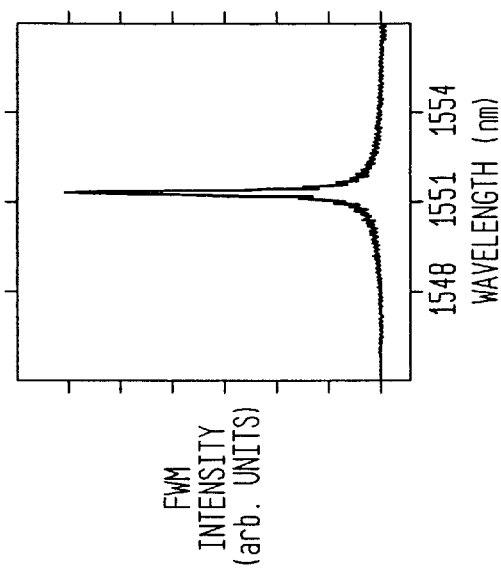
Figure 2D:
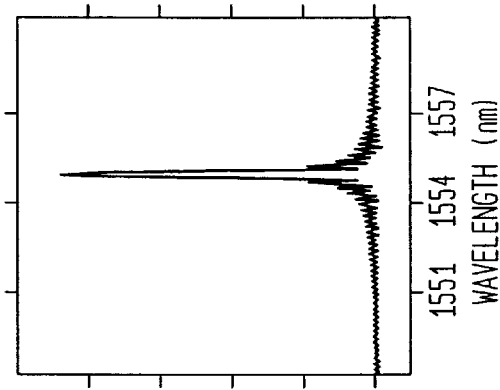
Figure 2F:
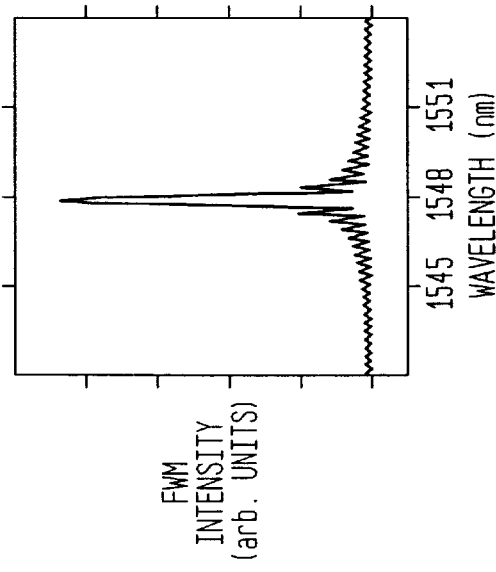

Examples of FWM tuning curves, as functions of $\lambda$ for three different DSF fibers are shown in FIGS. 2a, 2c, 2e (Fiber 1, FIGS. 2a–b; Fiber 2, FIGS. 2c–d, and Fiber 3, FIGS. 2e–f). All the measured curves differ markedly from the sinc2 function centered at $\lambda_0$ with a width of $2\pi/\kappa L$ expected using Eq. (3), for a constant $\lambda_0$ (FIGS. 2b, 2d, and 2f). The width of the measured FWM tuning curve directly provides a rough estimate of the fluctuation of $\lambda_0$ along the length of the fiber. Thus, fluctuations in $\lambda_0$ of the order of 4, 6 and 2 nm are obtained for fibers #1, #2, and #3, respectively, of FIGS. 2a–f.

Figure 3A:
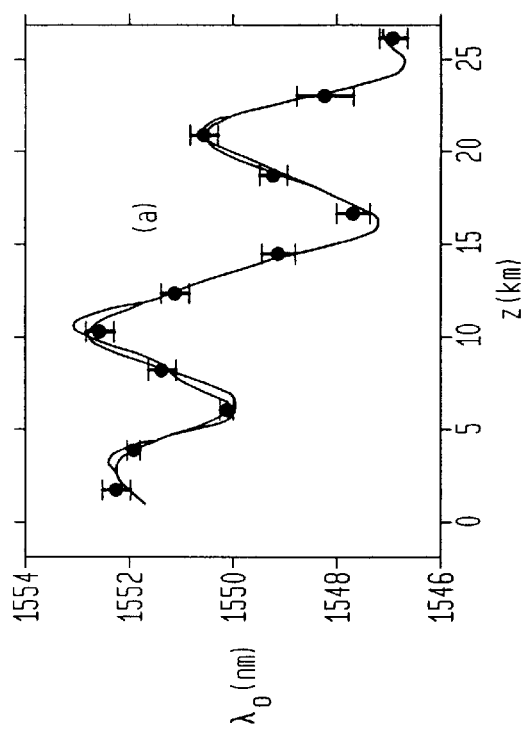
FIGS. 3a–3b compare the measured and calculated spatial distribution of the zero-dispersion wavelength for the fiber of FIGS. 2c and 2d.
Figure 3B:
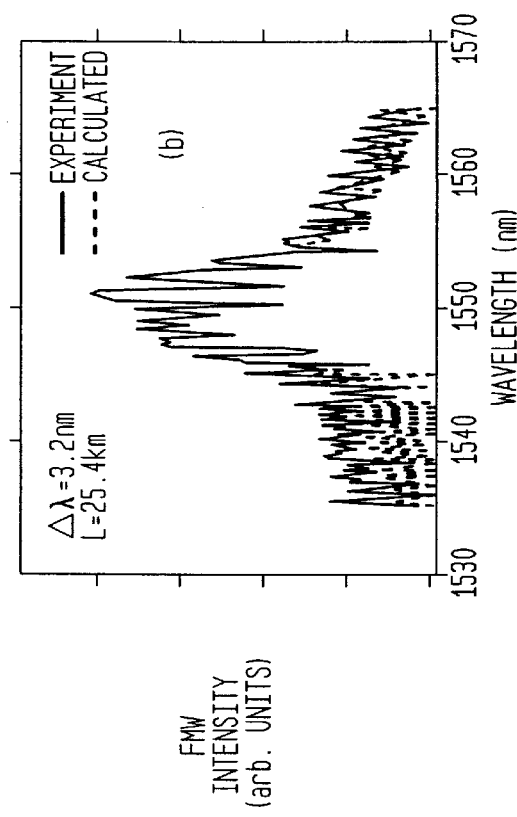
Figure 3C:
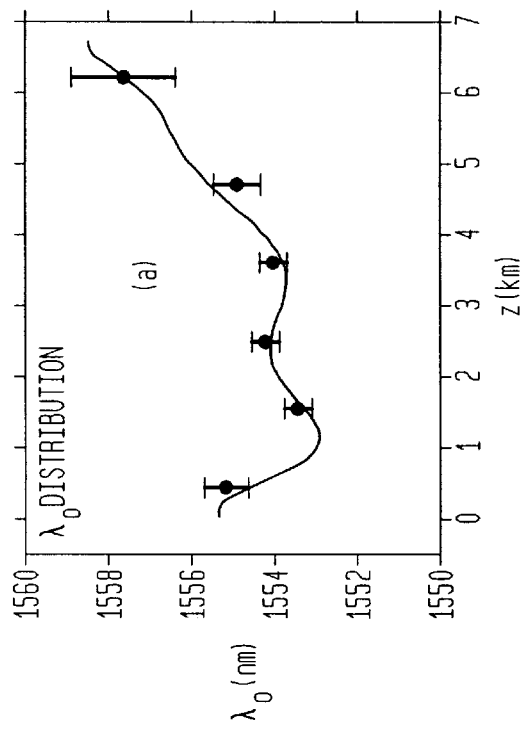
FIGS. 3c–3d show the corresponding measured and calculated FWM tuning curves.
Figure 3D:
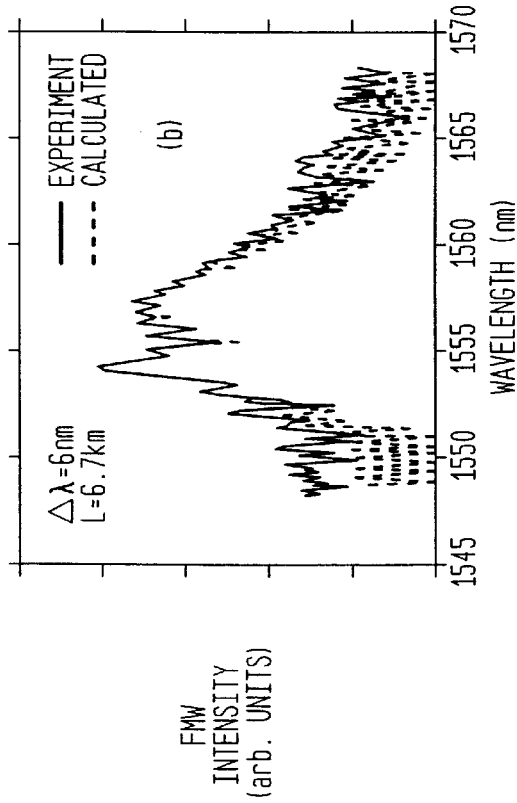

To illustrate the capabilities of the technique of the present invention, the disclosed procedure is applied to two dispersion shifted fiber spools of 6.7 (spool #2 of FIG. 2) and 25 km with average $\lambda_0$ of 1555 and 1550 nm, respectively, with the results plotted in FIGS. 3a and 3b, respectively. The points in FIGS. 3a and 3b correspond to a destructive measurement of $\lambda_0$ for both spools, inferred both from measurements of group delay and FWM. Note that measuring $\lambda_0$ in short spools where the dispersion changes rapidly is particularly inaccurate. The continuous curves correspond to the zero-dispersion wavelength profiles obtained by the inversion procedure, whereas the filled circles denote measurement of the zero-dispersion wavelength after cutting the fiber sand measuring the zero-dispersion wavelength at the cut. The calculated $\lambda_0(z)$ is shown by the continuous curves in FIGS. 3c and 3d. As can be seen, the inferred profile matches the observed spread in $\lambda_0$ very accurately (also when measured from both directions in the longer spool).

The present invention presents a new technique for mapping the spatial variations in the zero-dispersion wavelength along a fiber length. The technique is easy to implement, avoids fiber nonlinearities through the use of low power CW lasers, and has the potential to map spatial fluctuations with an accuracy of better than 100 m. The ultimate resolution is currently limited by the polarization mode dispersion of the fiber.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A method of determining the zero-dispersion wavelength of an optical fiber along its length, wherein said optical fiber has an input end and an exit end, comprising the steps of:

measuring the FWM intensity of the optical fiber at a plurality of wavelengths;

plotting the FWM intensity measured at each of said plurality of wavelengths to obtain a curve representative of the FWM intensity at each of said plurality of wavelengths; and performing a non-linear inversion on said curve to obtain the zero dispersion wavelength along the fiber length said measuring step comprising the steps of:

scanning the output beam wavelengths of two polarized laser tunable lasers into the input end of said optical fiber, keeping said output beam wavelengths separated by a constant wavelength; and continuously monitoring and recording the FWM intensity of the scanned output beam wavelengths at the exit end of the fiber.

2. A method as set forth in claim 1, wherein said non-linear inversion step comprises the steps of:

deriving a zero-dispersion wavelength profile from said curve;

parameterizing said zero-dispersion wavelength profile in terms of a predetermined number of parameters; and determining the zero-dispersion wavelength profile that best fits the measured FWM intensity by minimizing the total squared error between the measured FWM spectrum and an FWM spectrum derived from the functional relation between the zero dispersions wavelength profile and the FWM spectrum.

* * * * *